(12) United States Patent
Kapoor et al.

(10) Patent No.: US 10,713,609 B1
(45) Date of Patent: Jul. 14, 2020

(54) MODEL DRIVEN REPORTING

(71) Applicant: Numerify, Inc., Cupertino, CA (US)

(72) Inventors: Rahul Kapoor, Cupertino, CA (US);
Gaurav Rewari, Cupertino, CA (US);
Sadanand Sahasrabudhe, Rockville, MD (US)

(73) Assignee: Numerify, Inc., San Jose, CA (US)

( * ) Notice: Subject to any disclaimer, the term of this patent is extended or adjusted under 35 U.S.C. 154(b) by 1606 days.

(21) Appl. No.: 14/276,678

(22) Filed: May 13, 2014

(51) Int. Cl.
*G06Q 10/06* (2012.01)

(52) U.S. Cl.
CPC ................... *G06Q 10/067* (2013.01)

(58) Field of Classification Search
USPC ......... 705/348; 717/106; 707/602, 638, 687, 707/722
See application file for complete search history.

(56) References Cited

U.S. PATENT DOCUMENTS

| 7,681,185 | B2 | 3/2010 | Kapoor et al. | |
|---|---|---|---|---|
| 7,885,929 | B2 * | 2/2011 | Moore, Jr. | G06Q 10/10 707/638 |
| 7,987,159 | B2 * | 7/2011 | Gopal | G06F 16/254 707/687 |
| 8,504,513 | B2 * | 8/2013 | Aski | G06F 8/30 707/602 |
| 9,275,122 | B2 * | 3/2016 | Lions | G06F 16/258 |
| 2006/0235831 | A1 | 10/2006 | Adinolfi et al. | |
| 2009/0282385 | A1 * | 11/2009 | Boland | G06F 16/958 717/106 |
| 2011/0125705 | A1 | 5/2011 | Aski et al. | |
| 2014/0156643 | A1 * | 6/2014 | Rais-Ghasem | G06F 16/9038 707/722 |

OTHER PUBLICATIONS

EIC 3600 Search Report (Year: 2018).*
EIC 3600 Search Report—dated Jan. 19, 2020 (Year: 2020).*
EIC 3600 Search Report—dated Dec. 21, 2018 (Year: 2018).*

* cited by examiner

*Primary Examiner* — Andrew B Whitaker
*Assistant Examiner* — Johnathan J Lindsey, III
(74) *Attorney, Agent, or Firm* — Rahman LLC

(57) ABSTRACT

Approaches for a model-driven tool-agnostic reporting approach are provided. In one example, a report request is received from a business intelligence reporting application, from which a graphical template and query template are created, wherein the graphical template comprises the visual presentation of data responsive to the request and the query template specifies how the data responsive to the request is to be computed. The report created by the approaches described herein is compatible with multiple business intelligence reporting applications.

12 Claims, 5 Drawing Sheets

MODEL DRIVEN REPORTING

FIELD OF THE INVENTION

Embodiments of the invention relate to the generation and display of a report based on stored digital data.

BACKGROUND

A key feature of Business Intelligence ("BI") applications (or "tools") is the ability to present data with associated analytics, for which the general term "reporting" will be used throughout this document. The reporting tools vary in scope and function, but a popular use is the creation and presentation of "scorecards" or "dashboards," which may be thought of in one example as a collection of queries arranged to provide summary information at a glance.

Various BI reporting tools may provide detailed reports to supplement the dashboards and/or scorecards, as well as predictive analytics capabilities that allow for some level of planning, leveraging data mining algorithms and other techniques. BI application developers generally create the dashboards and reports manually based on end-user requirements and using the end-user's BI tool of choice. The reports typically obtain data from a data warehouse that is often built and managed using separate ETL tools, although the data could come from any source and the approaches detailed below are not limited to a particular data source.

A data warehouse is a database used for generating reports and data analysis. To facilitate reporting and data analysis functions, data is often transformed and organized in star schemas within a data warehouse. Populating the data within the data warehouse is done via ETL (Extract, Transform, Load) operations, which requires that the data warehouse maintain, in addition to the current state of the data warehouse, information about the last incremental data extractions obtained from the source tables. ETL operations propagate incremental changes made at the source tables into the star schemas of the data warehouse. ETL operations may transform the data prior to loading the data into the data warehouse. Examples of such types of transformation include data cleansing, data standardization, surrogate key generation, surrogate key replacement, unit of measure conversion, and currency conversion.

While the reports enabled by a BI tool may provide end-users with some degree of flexibility in rearranging aspects of the report layout or getting different views of data (e.g., using different parameters or filters), the current development model requires non-automated communication between end-users and report developers, which can cause several latency-related issues. End-users generally do not understand the data warehouse models, and therefore need to wait for a skilled professional to translate their reporting requirements into an actual report. Further, if changes are made at the data source that impact the data model, or just to the data model, then current reports may break until manually edited. Also, end-users with multiple BI tools need reports that work with each of them, which can require manual creation of reports for each BI tool.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
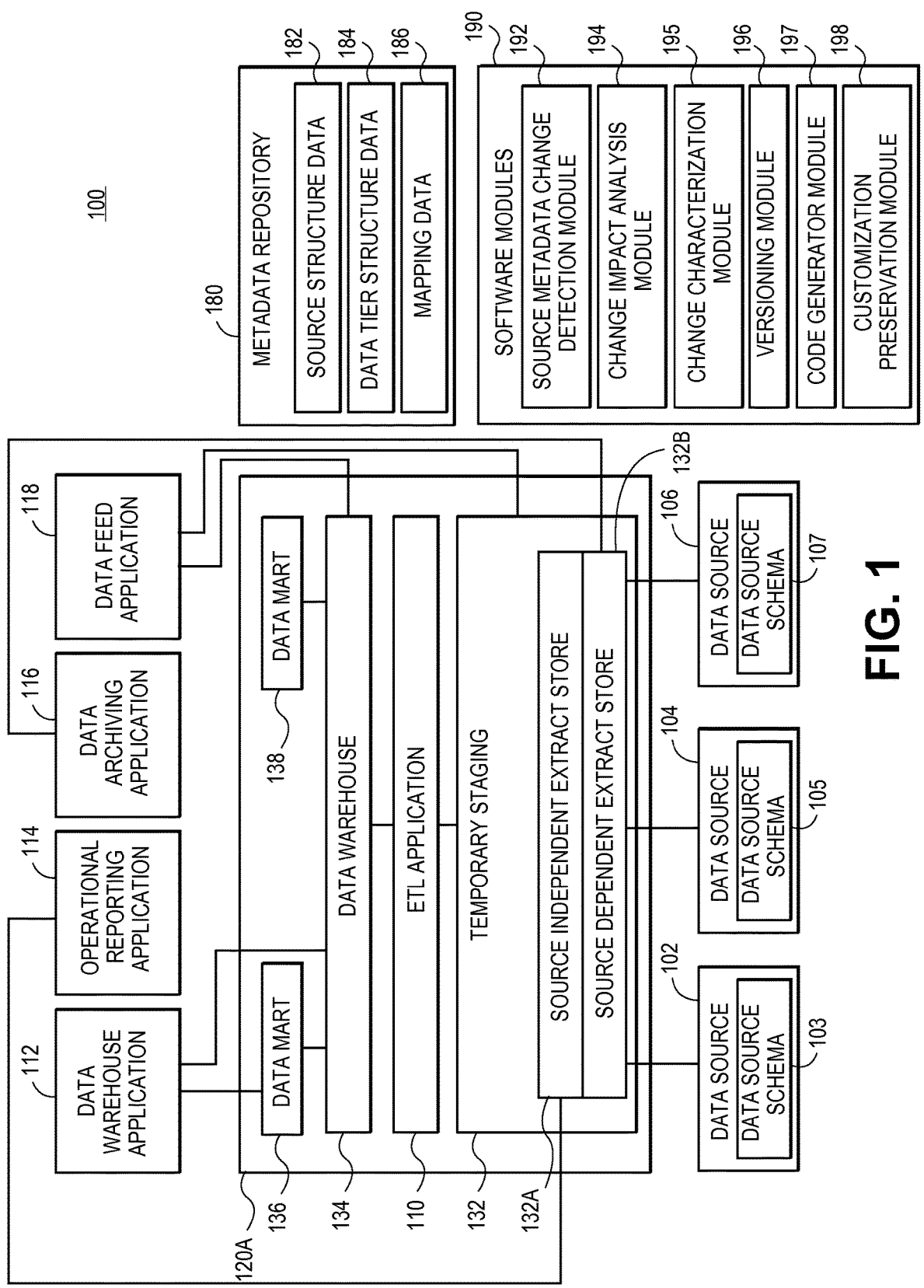
FIG. 1 is a block diagram of the components of a first exemplary data management system according to one embodiment of the invention.

Various approaches are provided for providing an automated BI Tool-independent modeling approach for reporting. The approaches described herein allow for specification of reports in a generic fashion for multiple BI tools. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Traditional reporting associated with BI tools has been accomplished by report developers independently and manually creating reports and dashboards for an end-user to utilize. The report developers use a report creation tool associated with a BI tool, often a graphical drag-and-drop interface, wherein they use objects known to the BI tool's metadata to design the graphic presentation of various reports and dashboards according to the end-user's requirements. These metadata objects may be thought of as building blocks by which the appearance of a report is created and often are accessible via APIs exposed by the BI tool. While the reports may offer end-users some degree of flexibility (e.g., rearranging a layout, using filters), the current development model requires non-automated communication between end-users and report developers so that when a business end-user identifies a need for a report, a report developer must manually create it.

The report developers designate the source of the data for the reports, which is often a data warehouse with a particular data model. If there are customizations or changes to the warehouse data model or changes at the data source that impact the warehouse model, the reports which source data from the warehouse may break until the changes are manually propagated to the reporting layer; i.e., a report developer must manually change aspects of the reports to account for the changes/customizations.

Where an end-user uses multiple BI tools, e.g., a company has acquired another company who uses a different BI tool, reports must be manually created to work with each individual BI tool, even if the reports are seeking similar data and presenting the data in the same way in each BI tool.

Embodiments described herein offer a declarative BI tool-independent model for specifying reports that query various data sources that helps address the concerns with the traditional reporting paradigm outlined above. In one example, reports query data sources directly, while in other embodiments, reports access data in a warehouse, a common extract store, the cloud, or even a flat file.

An example embodiment separates the presentation aspects of a report from the computation aspects, using what will be described herein as graphical templates vs. query templates. Graphical templates specify the format and visual appearance of a report. The metadata objects of various BI tools are stored in the metadata repository 180 of FIG. 1, as described below. Also stored in the metadata repository 180 is the entire reporting process in a declarative format, which is accessed by a code generation module to automatically create BI tool-specific executable code for the reports, which is then sent to the BI tool for the report to be displayed. The code generation process leverages a declarative description of what needs to happen for a particular report (based on metadata objects) to be created and programmatically creates a report in a BI tool-specific format.

To elaborate, the metadata repository 180 contains data describing the data model of the data sources, such as a warehouse, as well as data describing various BI tools' metadata. In this way, the BI tool reporting layer metadata is linked to the data source metadata that describes, among other things, the data model of the data source.

According to an embodiment, a report designer creates a graphical template for a report that is created in a tool-agnostic fashion. In one example, this is accomplished by using building blocks to create the report, which may be mapped to display objects in any number of $3^{rd}$ party BI tools, by leveraging the BI tools' APIs and the declarative code generation process. Once a report is designed in the BI tool-agnostic format, it is saved in a file that is in a human readable format.

A user selects this report, for example by clicking on a URL or by specifying it as a parameter to a command line report generation tool, and the BI tool-agnostic report is converted by an automated declarative code generation process (e.g., by the code generator module 197 of FIG. 1) into a BI tool-specific version of the report, which is then executed in the BI tool. Any query templates related to the report become embedded as queries in the report and are only executed when the end-user executes the query in his BI tool of choice, meaning that the queries are not executed during the code generation process; rather, the execution of the query template happens inside of the BI tool's environment when the report is executed.

Because the data model-dependent query templates are separated from the presentation aspects of a report, and the metadata repository contains a full declarative model of the entire reporting process (from source data extraction to populating a BI tool's metadata), change impact analysis and cross-query lineage may be extended to the reporting layer as well as incorporating source changes all the way to reports in an automated fashion. For example, because the metadata repository contains a declarative process from start to finish, a query that references a column T1 from table P may be flagged where a change to the underlying data model has occurred. In this example, the metadata repository contains data identifying T1 in the warehouse as being derived from columns A and B at the source. This is accomplished because T1 in the report is a metadata object which is the same as a metadata object in the warehouse, which through a series of transformations is actually derived from columns A and B at the source. If column B at the source is changed from a small INT to an INT, the report will break. The example approaches identify the query and the data model on which the query is based, and the metadata repository contains data describing the end-to-end process from the source to the data model, the impact of model changes at the source or the warehouse level may be analyzed and the impact understood. Because the example approach links the reporting metadata to warehouse metadata, change impact analysis may be performed and the query flagged.

In an embodiment, the BI tool-agnostic report is converted to a BI tool-specific report by a process undertaken by a declarative code generation process. When a user accesses the BI tool-specific report, the queries contained within the report are executed against whichever data source(s) are specified, thereby populating the report with data which is presented as specified in the graphical template associated with the report.

Architecture Overview

Embodiments of the invention advantageously provide for a data management system that supports an automated BI Tool-independent modeling approach for reporting in an efficient and automated manner. FIG. 1 is a block diagram of the components of a data management system 100 according to one embodiment of the invention. System 100 includes data sources 102, 104, and 106, data tier 120A, one or more data management applications 112, 114, 116, and 118, metadata repository 180, and software modules 190.

Data sources 102, 104, and 106 are broadly meant to depict any source from which data may be obtained. In practice, one or more of data sources 102, 104, and 106 may correspond to business application sources like SalesForce, MicroStrategy, NetSuite, ServiceNow, Marketo, or Eloqua; data may be extracted from such business application sources using the API's provided thereby, as well as other information being communicated via the API's, as discussed herein. One or more of data sources 102, 104, and 106 may also correspond to public or government databases; for example, such databases may store information about weather, currency exchange rates, public government records, and the like. While only three data sources are depicted in FIG. 1; embodiments of the invention may be used with any number of data sources. Data source 102, 104, 106 each may persist data using data source schema 103, 105, 107 respectively. Note that each company or organization storing data in or retrieving data from a data source (such as data source 102, 104, and 106) may wish, at any time and at multiple occasions, to customize the source data schema employed by the data source.

The data tier, as broadly used herein, refers to any computerized approach for storing data which may be accessed by a data management application, such as, for example, data management applications 112, 114, 116, and 118. A particular example of a data tier is depicted in FIG. 1 and identified as data tier 120A. As shown in FIG. 1, data tier 120A may comprise a temporary staging area 132, an ETL application 110, a data warehouse 134, and one or more data marts 136, 138.

Temporary staging area 132 broadly refers to any mechanism for temporarily storing data retrieved from data sources 102, 104, and 106 to facilitate its use by data management applications 112, 114, 116, and 118. Once data is populated in temporary staging area 132, the data may be formatted or processed prior to loading the data into data warehouse 134. For example, in data tier 120A depicted in FIG. 1, temporary staging area 132 comprises a Source Independent Extract Store 132A and a Source Dependent Extract Store 132B. In this example, data that is retrieved from a data source may be stored directly into Source Dependent Extract Store 132B. Thereafter, the data may be modified to transform the data into a source independent format and moved to Source Independent Extract Store 132A. As implied by the name, once data has been moved from temporary staging area 132 to data warehouse 134, the data may be removed from temporary staging area 132.

ETL application 110, as broadly used herein, refers to one or more applications for extracting data from temporary staging 132, potentially performing one or more data transformations on the extracted data, and loading the transformed data into data warehouse 134. ETL application 110 may retrieve an initial extract of data from temporary staging 132 and thereafter retrieve incremental extracts corresponding to the changes made at a data source since the data was last retrieved therefrom. Prior to loading the extracted data into data warehouse 134, ETL application 110 may perform a variety of data transformations on the extracted data, such as but not limited to archival processes, CDC (change data capture) processes, source dependent to source independent processes, delta propagation processes, surrogate key generation processes, and surrogate key replacement processes. Processes for performing data transformations are well understood to those skilled in the art and will not be expounded upon herein.

Data warehouse 134, as used herein, refers to a database for reporting and data analysis. Data stored by data warehouse 134 may be obtained from a plurality of sources, namely data sources 102, 104, 106. Data warehouse 134 may store current and historical data and may be accessed by one or more of data management applications 112, 114, 116, and 118.

Data marts 136, 138, as used herein, each correspond to a database that stores a subset of the data stored in data warehouse 134. The data stored within data marts 136, 138 typically serves a particular focus; for example, a particular data mart might serve a specific business line or team. While only two data marts, namely data marts 136, 138, are depicted in FIG. 1 for clarity, embodiments of the invention may employ any number of data marts, including no data marts, one data marts, or three or more data marts.

Data management applications 112, 114, 116, and 118 may access either data marts 136 and 138, data warehouse 134, and/or from temporary staging area 132, depending upon the needs of a particular implementation. For example, FIG. 1 depicts data warehouse application 112 accessing data stored in data mart 136, operational reporting application 114 accessing data stored in Source Independent Extract Store 132A, and data archiving application 116 accessing data from Source Dependent Extract Store 132B. Of course, these are but a few examples, as other implementations may confirm a data management application to access, read, or store data differently, e.g., FIG. 1 also depicts data warehouse application 112 having the capability of accessing data from data warehouse 134.

While FIG. 1 depict a way to implement a data tier, embodiments of the invention may persist data in a data tier in many different ways; consequently, embodiments of the invention do not rely upon any particular mechanism for implementing a data tier. Embodiments of the invention may operate with any implementation of a data tier so long as the data tier is capable of persisting data in one or more data tier schemas. As used herein, the term "data tier schema" refers to a schema used to persistently store data in the data tier. A data tier schema may be used in data warehouse 134, data mart 136, data mart 138, Source Independent Extract Store 132A, or Source Dependent Extract Store 132B, for example.

Data warehouse application 112, operational reporting application 114, data archiving application 116, and data feed application 118, as broadly used herein, refer to applications or services which may issue queries for data to the data tier and, in turn, use the data retrieved from the data tier in disparate ways. While system 100 depicts the inclusion of data warehouse application 112, operational reporting application 114, data archiving application 116, and data feed application 118, the presence of these applications is optional, as a particular implementation of system 100 need not include each of applications 112-118. Therefore, system 100 may include any combination of applications 112-118.

Metadata repository 180, as broadly used herein, refers to any mechanism for storing metadata. The metadata stored in metadata repository 180 describes the customizations performed by a customer throughout system 100. This metadata may be used to describe how data is stored at a data source or at data tier 120A as well as provide insight into how data originating at a data source is used by all aspects of system 100. Further, this metadata may be used to customize the operation of software modules 190.

Different types of metadata may be stored in metadata repository 180. To illustrate, metadata repository, in an embodiment, may store source structure metadata 182, data tier structure metadata 184, and mapping data 186, although it should be clear that the types of metadata stored in metadata repository 180 are not limited to these examples. Source structure metadata 182 describes the structure, characteristics, and configurations of a data source (including the source data schemas), data tier structure metadata 184 describes the structure, characteristics, and configurations of aspects of the data tier (including data tier schemas), and mapping data 186 describes a mapping or relationship between attributes of source data schemas to attributes of data tier schemas. In this way, the metadata stored by metadata repository 180 may be used to view how data flows through system 100 and how a change to an aspect of one type of data affects other portions of system 100. The use of metadata stored by metadata repository 180 in one embodiment shall be described in more detail in the next section.

Software modules 190 refers to a set of software processes or modules which are responsible for performing automated functions based on the metadata stored in metadata repository 180, e.g., software modules 190 support customizations made by a particular company or organization to components of system 100. Generally, software modules 190 are dynamically composed in executable form based on the metadata stored in metadata repository 180.

Source metadata change detection module 192, as broadly used herein, refers to one or more processes for detecting a customization made to a data source, such as a change made by a customer to a default version of a data source schema. Source metadata change detection module 192 may ascertain the structure of data source schemas using APIs exposed by the corresponding data source. Source metadata change detection module 192 may periodically execute and use the API of a particular data source to ascertain information about the structure of a data source schema. By comparing information learned in this manner across different points in time, source metadata change detection module 192 can ascertain if a customer has made a customization to data source 102, 104, or 106. Upon determining that a customization to a data source has been made, source metadata change detection module 192 may notify change impact analysis module 194 so that change impact analysis module 194 can assess the impact of the detected customization upon other parts of system 100.

Change impact analysis module 194, as broadly used herein, refers to one or more processes for assessing the impact and implications of customizations performed or requested by a customer upon other portions of system 100. Metadata stored in metadata repository 180 indicates the lineage of how data moves through system 100; for example, mapping data 186 contains information that describes what attributes of data source schemas are mapped to attributes of data tier schemas. In response to being notified that an aspect of a data source schema has changed, change impact analysis module 194 may read mapping data 186 to determine what other portions of system 100 are affected by a changed attribute or entity, as mapping data 186 contains information describing how that changed attribute or entity may affect other schemas, reports, or ETL processes. To illustrate a simple example, if a customer performs a customization on a data source schema to change the data type of a particular attribute 186 Integer to String, then change impact analysis module 194 may review mapping data 186 to identify any report, data tier schema, or ETL process which will need to be updated to accommodate that customization. After change impact analysis module 194 determines the impact on system 100 caused by a particular customization at a data source, change impact analysis module 194 notifies change characterization module 195. In another example, change impact analysis module 194 may be used to do reporting lineage analysis, as discussed further herein.

Change characterization module 195, as broadly used herein, refers one or more processes for characterizing a particular change made to a data source. After characterizing a particular change made to a data source, change characterization module 195 may perform a responsive action to accommodate the change, such as (a) ignore the change made to the data source, (b) automatically update data tier structure data 184 and/or mapping data 186 stored in metadata repository 180, without human input or instruction, to allow the change made to the data source to be accommodated by system 100, or (c) request user input on what actions should be performed in response to the change made to the data source. Change characterization module 195 may solicit and receive user input, if need be, via a user interface according to a variety of different implementation designs. If change characterization module 195 updates data tier structure data 184 and/or mapping data 186 stored in metadata repository, change characterization module 195 may notify code generator module 197 so that code generator module 197 may implement the changes specified by the updated metadata.

Code generator module 197, as broadly used herein, refers to one or more processes for implementing changes specified by metadata stored in metadata repository 180. Code generator module 197 may read values stored in metadata repository and thereafter use the read values as input to executable code, which when executed, causes changes to the structure or operation of data tier 120A to reflect the metadata stored in metadata repository 180. For example, code generator module 197 may make a change to a data tier schema and potentially as a result, move and/or transform data from one data type to another data type based on the schema change. In addition to making changes to data tier schemas and moving/transforming data, code generator module 197 may also update, add, or delete executable jobs responsible for ETL processes, reports, dashboards, and any other functional aspect of how data may be used in system 100.

Versioning module 196, as broadly used herein, refers to the one or more processes responsible for updating metadata stored in metadata repository in response to a change detected in either a data source or in the data tier. Versioning module 196 may record information describing the circumstances of what was changed each time metadata is updated to reflect that change. In this way, changes in system 100 are always made in a versioning manner so that discrete changes made to system 100 may be analyzed at a future date in a meaningful manner.

Customization preservation module 198, as broadly used herein, refers to one or more processes for determining which customer specific customizations can be supported in a new customer-wide version of schemas employed by the data tier released by the operator of system 100. In an embodiment, each new customer-wide version of schemas employed by the data tier released by the operator of system 100 will correspond to a particular version of data tier structure data 184. For example, if the operator of system 100 wishes to deploy an updated version of data tier structure data 184, then customization preservation module 198 may be used to determine how customer specific customizations can be supported in a new version of metadata.

Having provided a description of the components of system 100, additional details of how a data management system may support customer customizations according to an embodiment of the invention are presented below.

Model Driven Reporting

Figure 2:
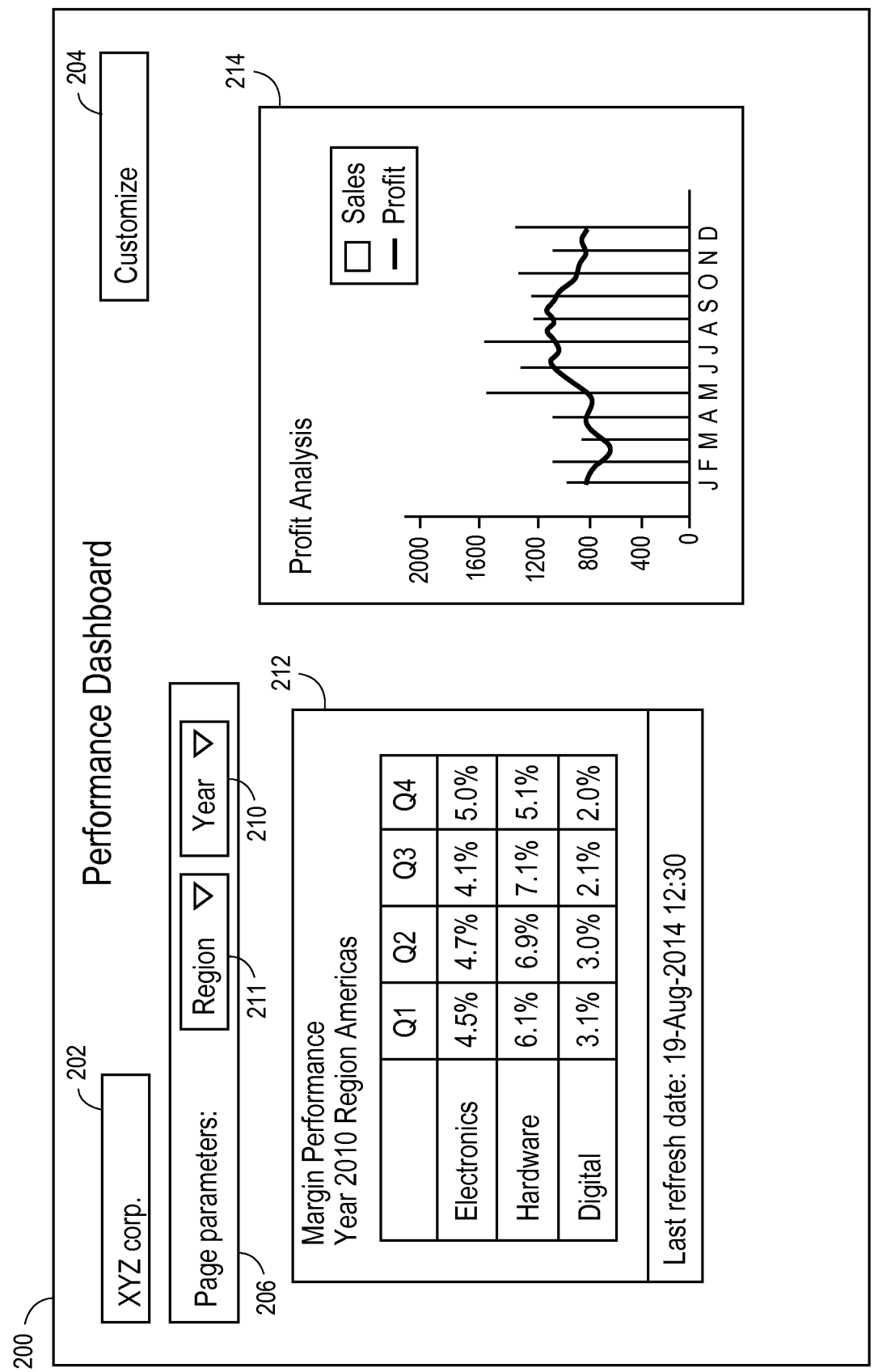
FIG. 2 is a block diagram of a sample business intelligence report according to an embodiment of the invention.

FIG. 2 is a block diagram of a sample business intelligence report 200, in one example provided by any of data warehouse application 112, of FIG. 1, according to an embodiment of the invention. The sample report may comprise one or several screens, each providing historical, current, and/or projected data about the business, often in graphical format. A collection of reports is generally called a dashboard. A company identifier 202 often serves as a static header for reports, while options for customization 204 are usually provided. As will be discussed herein, in prior approaches potential customizations to a report may be limited by a disconnect between the reporting model (as defined by the particular BI application) and the data model of the underlying data.

Certain data parameters 206, such as a business region 211 and a time period 210 might be selected, which as discussed further herein may operate as a filter on the data returned by an embodiment. Various sub-reports may be part of the greater BI reports, such as a report on profit margin 212 broken down by quarter and business unit, or a profit analysis report 214 detailing total sales and profit margin over a specified time period.

The sample report of FIG. 2 is comprised of visual presentation elements and the data retrieved in response to the underlying queries used to obtain the data from a data source such as a data warehouse, although as stated earlier, data sources of embodiments are not limited to data warehouses. BI application reports have presentation components, which show how the data is visualized, and computation (or query) aspects, which is how the data that is shown is computed. According to an embodiment, the presentation aspects of a report, which are BI application-dependent, are separated from the data-model dependent queries via the use of modeling techniques that separate the presentation aspects of a report ("graphical templates") from the computation aspects ("query templates").

In an example, the graphical templates specify the format of a report. For example, certain reports may be grid- or graph-based, or both with rows and columns and axis labels. In an embodiment, a report designer using a particular set of toolkit elements manually designs the graphical template of a particular report in a BI tool-agnostic format. The list of the toolkit elements is customizable and extensible, allowing for the modification and addition of elements to support new graphical elements that may exist in various BI reporting tools; in this way, when the BI tool-agnostic graphical template is converted via the automated declarative code generation process into a BI tool-specific report, the particular target BI tool is able to interpret the graphical elements and display the report in the manner is was designed.

Any graphical template for a report designed via this approach is first described in a BI tool-agnostic model and then converted into the specific format of the target BI tool by an automated process of code generation. The code generation module understands the model used by various BI tools, maintains a mapping from the BI tool-agnostic model to the target BI tool model and programmatically generates to the BI tool's model, in one example by leveraging API's exposed by the target BI tool. In one approach, by leveraging APIs exposed by BI tools, the graphical templates may operate as a common denominator across the assorted BI tools, so that each BI tool's elements may be mapped to elements defined in the BI tool-agnostic graphical templates.

In an example, a designer creates a graphical template for a particular report; for example, a pie graph showing sales for each geographical region of a company. The way the report looks (graphical template) is separated from the query that pulls the necessary data to populate the report from various data sources (query template). Concerning the graphical template, it is built by the designer using toolkit elements that map to whichever particular target BI tool may be used by the customer.

Various elements of the toolkit have various definitions and are in an example mapped to the metadata of various supported BI tools/applications, which allows the graphical templates to be BI tool-agnostic. Different BI tools offer different types of reports composed of different types of sections and elements, as discussed above. For example, a BI tool may offer a grid report, which is a commonly used type of report. Grid reports are generally displayed using a formatted, cross-tabular display of the report data. A graph report is a representation of data in a visual format to help illustrate overall trends, identify medians and exceptions, and so on. A BI tool may offer numerous types of graph reports, such as bar, line, pie, etc.

In this example approach, any report is first described using the BI-agnostic declarative model (including separation of the report into graphical templates and query templates), and when the report is needed in a format executable by a particular BI tool, the report is converted into the specific format digestible by the BI tool by an automated process of code generation. The code generation process understands the nuances of specific target BI tools, maintains a mapping in the metadata repository (described further herein) from the declarative model to the model used by the specific BI tool, and programmatically generates to the BI tool's model (a format understood by the specific BI tool), in one example by utilizing APIs of the BI tool. The code generation process understands target BI tools in one example because code is written which can map the declarative model into a BI tool's specific model by using the appropriate BI tool's APIs to create reports in the specific BI tool's format.

Back to the above example of the report comprising a pie graph showing sales for each geographical region of a company, an end-user using a BI tool may simply see a URL to click in order to generate the report. Once clicked, the BI tool-agnostic graphical template is processed by the code generation module into a BI tool-specific format. The code generation process understands the mapping between the toolkit elements comprising the BI tool-agnostic graphical template and their equivalent mappings in the target BI tool, and generates an executable file that is returned to the target BI tool for execution. The BI tool executes the file and then the query elements in the query template are processed. Once the data is returned in response, the report is displayed in the target BI tool.

In an example, a graphical template may be defined in a markup language such as XML or via another method known in the art. In another example, the graphical template may comprise a binary executable readable by the code generation process, as previously discussed. One example of a graphical template definition may be:

<presentation template>
<section: Page Header>
<Attributes: Appearance> . . .
<Attributes: Position . . .
<Attributes: Size . . .
<Attributes: Text . . .
<Attributes: Data . . .
<Attributes: Navigation Links . . .
<Attributes: Widgets . . .
</section: Page Header>
<section: Document/Layout Header . . .
<section: Detail Header . . .
<section: Detail>
<Graphical Element: >
<Formatting: >
<Formatting Conditions: >
<section: Detail Footer>
<section: Document/Layout Footer>
<section: Page Footer>
</presentation template>

The format of a report in the graphical template is generally described in terms of document sections; for example, Page Header, Document/Layout Header, Detail Header, Detail, Detail Footer, Document/Layout Footer, Page Footer, and so forth.

Each section may have attributes associated with it, such as: Appearance, Position, Size, embedded objects, etc. Depending on the element, the formatting may vary. For example, for a graph the formatting may select the style of the graph (bar/line/scatter, etc.), among other things, while for a grid it may apply to cells of the grid. The graphical template model also supports conditional formatting; for example, highlighting or using different colors based if certain conditions are met.

Query templates are in an example built on metadata objects that can be reused across multiple reports. Example metadata objects would be attributes (e.g., that typically form rows of a report); hierarchies that describe relationships between attributes; fact tables; metrics (e.g., that typically form columns of a report and can be thought of as in one example as functions such as joins on facts or other metrics; transformations (e.g., functions that apply on metrics); and filters that in an example are predicates to limit data analyzed in a report that apply on attributes and/or metrics.

In an example, a query template also may be defined in a markup language such as XML or via another method known in the art. One example of a query template definition may be:
<query type: SQL/MDX/XQuery>
<query parameters>
<query>
<result binding>

An example model allows that the computation required by the query template may need to be delegated to different data sources, each of which may support different query languages (e.g., SQL, MDX, XQuery), and an example embodiment maps query results from different languages to metadata objects used for presenting the report results. As an example, a SQL query returns columns from a data source. Example query "Select A,B,C, SUM(A) from Table T" will return 4 columns. If a grid presentation style report is used, the grid would need to have 4 columns as well, with labels such as "P,Q,R, SUM(P)," which correspond to objects in the graphical template that are used to display the report in a BI tool-agnostic fashion. The example embodiment maps the query parameters from the query template to the objects in the graphical template.

In an example, dynamically configurable parts of queries generated by the BI application, such as prompts/parameters and runtime filters, are delineated from static, predefined parts of the model. For example, in a query "Select A,B,C, SUM(A) from Table T where D=@p," the query itself is static but the parameter "@p" is dynamic.

Facts can be aggregated at different levels of a dimension hierarchy, for ex. we may want to aggregate Sales by Continent/Country/State/City of the Geography Dimension hierarchy. Any aggregates in a report are computed up to the specified level, with the lowest level being the default if no level is specified because computing to the lowest level in a hierarchy allows for drilling up to any level (so in the previous example, Sales by Continent, Country or State can be computed from Sales by City); therefore, this approach allows the model for specifying reports to be as detailed as the requesting BI tool is capable of handling.

Graphical templates may include multiple query templates; e.g., the graphical templates may refer to one or more query templates as the graphs, grids, etc., need to be populated based on executing queries. The query templates are defined separately for modularity and for separating out parts that need to be linked via metadata. For example, a dashboard with multiple reports or analytical applications capturing multiple stage workflows where analysis may be required across the workflow stages may require multiple, possibly interrelated queries.

The stages in a multiple-stage workflow may be tracked through a common identifier (such as a workflow ID or stage descriptions) or modeled as partitions in the underlying data model with query templates covering each stage and global queries going across stages. If the separate queries are declared as linked, either as part of a workflow or just related by groupings, then incompleteness or constraint violations that will prevent or hinder cross-query analytics may be flagged based on an examination and analysis of the underlying data model. For example, the underlying model for linked dashboards is analyzed for the presence of a linking identifier and if one cannot be located, then the query is flagged so that the report authors may correct the errors.

Cross-query analytics may be guided based on the underlying data model and specified interaction rules, which may be defined by a report developer. For example, if a filter is applied on one query, then the filter may be automatically or conditionally applied to all relevant linked queries. If a business user were using a BI application to analyze production costs, marketing costs, sales costs, revenue from sales, and maintenance revenue for the company as separate queries that are identified as linked, and a filter is applied on one of the queries, such as to limit the query to a specific product family, then application of that same filter on the linked queries may be suggested or performed. In this case, the linking attribute would be the product.

Individual BI tools may or may not offer run-time constructs for various elements, such as: (1) view filters that apply on report results once they are generated (i.e., they are ad-hoc filters applied by the tool on the in-memory report results that are not pushed to the report data source); (2) derived elements that group attribute elements to provide a different view; (3) derived metrics that allow for on-the-fly computations based on the data available in reports; (4) dynamic aggregation that allows for on-the-fly aggregation; (5) search; (6) sorting in an order different than that in which the report data was generated; (7) pivoting; (8) drilling up or down attribute hierarchies; or (9) run-time caching of results. In an embodiment, these run-time constructs are outside the scope of model driven reporting which is focused on generating the reports, not on how they get used once generated.

In an example, the declarative model approach allows for supporting the minimum common denominator among various BI tools. For BI tools that support advanced report generation level constructs (e.g., drill paths or maps) that aren't specified in the declarative model, the BI tool defaults may be used automatically. For advanced BI tool-specific report generation level constructs that don't have defaults, the declarative model supports a BI tool-specific section to specify appropriate values, for example via a name-value pair section.

Different BI tools have different capabilities: Microsoft Excel may be considered a simple BI tool while MicroStrategy is considered quite complex. The declarative model in an example operates at a "lowest common denominator" wherein even some BI tools that lack constructs shared by the current techniques can implement reports generated through the declarative model. So even simple tools like Excel can be used as BI application reporting front-ends. Even though Excel lacks basic constructs assumed in the model like the notion of "sections" the declarative model may compensate for those, e.g., by using indentation or separators for sections when the reports are being code-generated. This compensation logic is codified based on an understanding of the target BI tool and the tool independent reporting model. Understanding the differences between the two and codifying the mapping is done manually at development time, but once codified that mapping is executed as part of code generation without any further manual input for any number of reports. Similarly, if a BI application doesn't support a particular graph type in the declarative model, the approach can compensate by mapping to the closest approximation available in the BI application.

This approach allows report designers and developers to work solely with the tool independent reporting model, as the specific reports requested by users are generated automatically and programmatically pursuant to the declarative model.

By separating the graphical template presentation aspects from the data model-dependent query templates and storing the query template metadata with identified lineage to the underlying data model metadata, an example approach may automatically identify the impact of changes in the source model to the reporting layer, often referred to as "change impact analysis." Because reporting is traditionally done in a BI application-specific tool with its own metadata that is separate from the data source or warehouse metadata, it has not been possible in prior-art, to extend change impact analysis to the reporting layer.

The example approach maintains a full declarative model of the entire process from source data extraction to reporting and populates an individual BI application's metadata based on the full model through APIs exposed by the BI application. This allows change impact analysis to be extended to the reporting layer and in some examples incorporate changes to the data source all the way to reports in an automated fashion. As an example, take a query "SELECT A,B,C, SUM(A) from TABLE T." If in the warehouse model "A" is changed to "ANew," the query may be modified to "SELECT ANew,B,C, SUM(ANew) from TABLE T" because the Query template metadata is linked to the report data source metadata and the metadata repository contains data indicating that the "A" in the query is the "ANew" in the updated warehouse model.

In an example approach, data discovery BI is supported on either the source data as-is, or the warehouse model version of the source data generated by ETL processes and transformed for analytics and allows for promotion of the results of data discovery in such Data Discovery style BI tools to traditional BI applications in an automated manner by taking advantage of the declarative reporting model. For example, if a user notices something significant in visualization metaphors like outlier detection or heat maps while doing data discovery, the user can have a query template generated (often with a single click) for the band and/or segment that the user wants to monitor regularly. This is possible because the current approach analyses the underlying data model (either the source version or the transformed version) to determine how the data discovery results were generated and to determine the filters that apply to different parts of the visualization. Therefore the exact query for monitoring the segment identified by the user can be programmatically generated, and in an example is associated with a default graphical template providing a starting report with one click that can be subsequently refined and enhanced in the BI-specific application reporting interface.

Therefore, associating ad-hoc data discovery and/or analysis to traditional BI-specific approaches is achieved in one example by converting user-identified monitoring requests in data discovery interfaces to the declarative report model.

Figure 3:
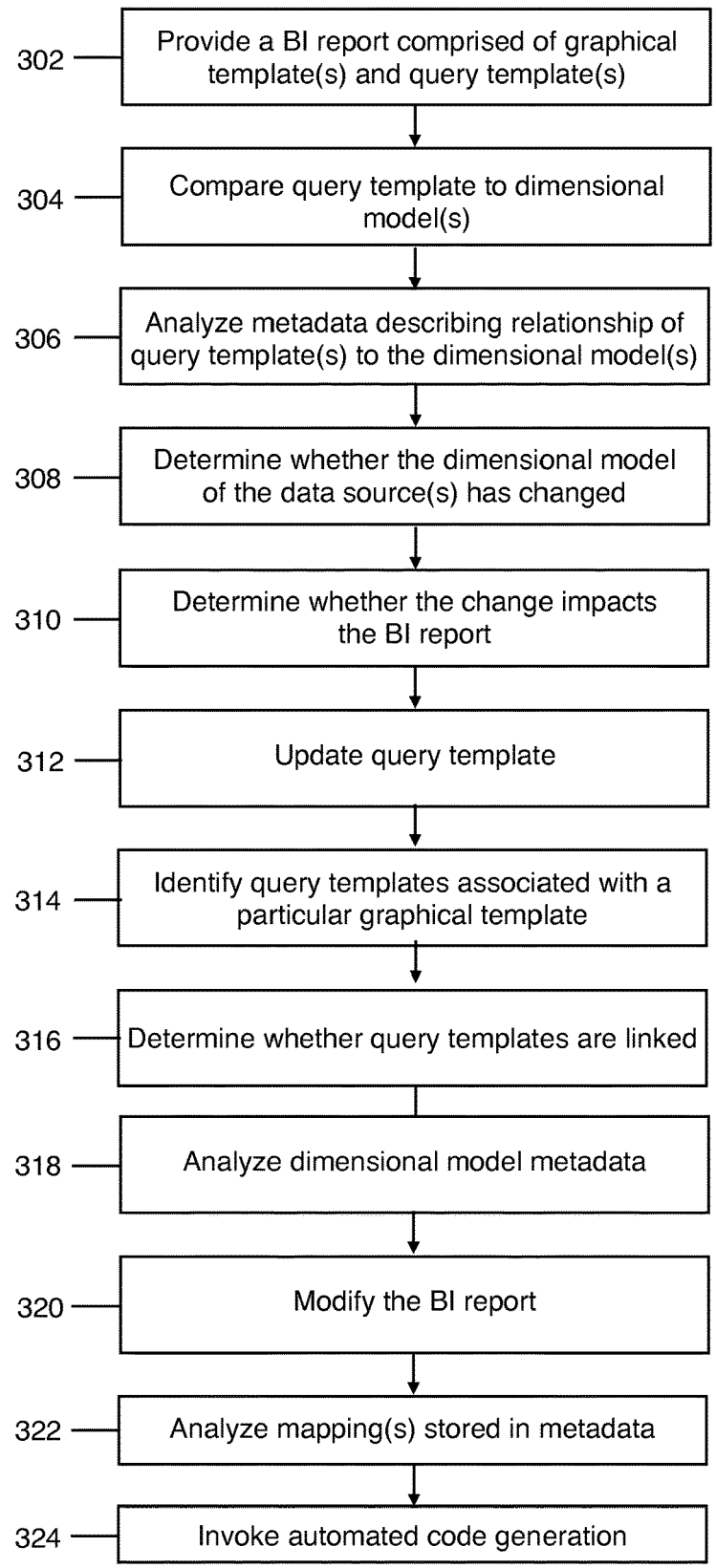
FIG. 3 is a flowchart illustrating example steps for providing an automated BI Tool-independent modeling approach for reporting according to an embodiment of the invention.

FIG. 3 is a flowchart 300 illustrating example steps for providing an automated BI Tool-independent modeling approach for reporting according to an embodiment of the invention. In some implementations, the process 300 can include fewer, additional and/or different operations. In other examples, only one or some subset of these operations may be included, as each operation may stand alone, or may be provided in some different order other than that shown in FIG. 3. At 302, a BI report is provided that is composed of a graphical template and a query template. In an embodiment, the graphical template defines presentation aspects of the BI report and the query template defines the computational aspects of the report; for example, the calculations required from a particular data source. In this example, the graphical template and query template are BI tool-agnostic; meaning, that the particular format of the graphical template and query template are not limited to any one BI tool.

At 304, the query template is compared to the data model of one or more data sources; for example, a data warehouse, a data feed application, a data mart, and/or a temporary staging of an ETL process.

At 306, metadata describing the relationship of the query template to the data model of the data source(s) is analyzed, for example to determine whether elements of the query template are reliant upon aspects of the data model.

At 308, it is determined whether the data model of the data source(s) has been changed; for example, a piece of data that previously had been characterized as an INT is now a SMALL INT.

At 310, it is determined whether the change identified at 312 affects the BI report. In an example, if a data field name has been changed, a column added or dropped, or the definition of a data value is different, then the BI report may break. Extending this lineage analysis to the reporting layer of a BI tool is made possible in one example by separating the data model-dependent query templates from the presentation aspects of a BI report and storing the query template metadata with lineage to the underlying data model metadata.

At 312, the query template is automatically updated whenever possible to reflect the updated data model of the data model upon which it is dependent.

At 314, an embodiment identifies that one or more query templates are associated with a particular graphical template. One example of this would be a "dashboard" BI report.

At 316, a determination is made that at least two of the query templates are designated as linked. The particular technique used to link the query templates may be one of any known in the art.

At 318, metadata is analyzed that describes the data model of all the data sources relied upon by the linked query templates. As part of this process, it is determined whether a change or other interaction made to one of the linked query templates would have any implications for any of the other linked query templates. For example, where an analytical application captures a multiple stage workflow, the stages of the workflow may be tracked via the linkages between query templates. By analyzing the data models of the data sources associated with the linked query templates, any incompleteness and/or constraint violations that may hinder the cross-stage analytics may be flagged.

In an example, the underlying data model may be analyzed for linked dashboards to identify the presence of a linking identifier and flag its absence if it cannot be located. Additionally, in an example, cross-query analytics such as a filter being applied on one query may be identified and application of the filter suggested for all relevant linked queries. In an embodiment, at report design time the insertion of cascaded filters is encoded so that when the report is generated and a filter applied, the BI Tool can suggest cascaded filters based on the encoding.

At 320, the BI report is modified pursuant to a set of predefined interaction rules for specifying behavior of linked queries.

At 322, a mapping stored in a metadata repository, for example metadata repository 180 of FIG. 1, is consulted. In an embodiment, the mapping identifies elements of the tool-agnostic graphical template that may be correlated to presentation elements defined by a particular BI tool. For example, the tool-agnostic graphical template may contain an element corresponding to a line graph, but in a format that is not tied to definition of a line graph in any particular BI tool. The mapping identifies, for one or more particular BI tools, the details of a line graph element defined by that tool that may be switched out for the tool-agnostic graphical template version of the line graph. In an embodiment, there are additional mappings, such as a mapping between the BI tool-agnostic query template and the tool-specific query mechanism as well.

At 324, an automated code-generating process is invoked to create a BI report that is compatible with a particular BI tool. Using the mapping discussed above, presentation elements in the tool-agnostic graphical template are replaced by presentation elements specific to the particular target BI tool. For example, the tool-agnostic graphical template line graph element is replaced, via the automated code-generation process, with a line graph element that is defined in the target BI tool and directly compatible with that tool.

Figure 4:
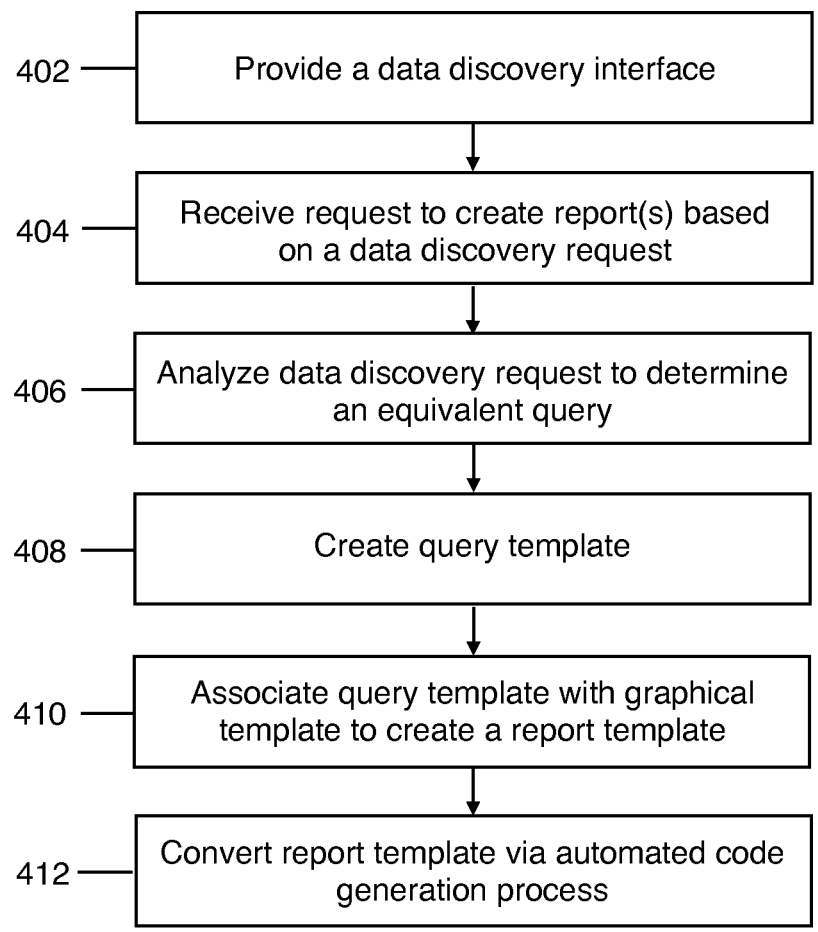
FIG. 4 is a flowchart illustrating example steps for providing an automated BI Tool-independent modeling approach for reporting according to an embodiment of the invention.

FIG. 4 is a flowchart 400 illustrating example steps for providing an automated BI Tool-independent modeling approach for reporting according to an embodiment of the invention. In some implementations, the process 400 can include fewer, additional and/or different operations. In other examples, only one or some subset of these operations may be included, as each operation may stand alone, or may be provided in some different order other than that shown in FIG. 4. At 402, a data discovery interface is provided wherein the interface is connected to one or more data sources; for example, a data warehouse, a data feed application, a data mart, and/or a temporary staging of an ETL process. In an embodiment, the data model of the data sources(s) are described in metadata; for example, metadata repository 180 of FIG. 1.

At 404, a request is received to create a BI report based on a data discovery request, for example via the data discovery interface of step 402.

At 406, the data discovery request is analyzed to determine an equivalent query that would return the same results as the data discovery request.

At 408, a query template is created based on the equivalent query and the underlying data model of the data source implicated by the request.

At 410, the query template created in step 408 is associated with a default graphical template, which in an embodiment creates a report template and wherein the query template and the graphical template are in a BI tool-agnostic format, as discussed previously.

At 412, the report template is converted via an automated code-generation process into a BI report that is compatible with a particular BI tool.

In an embodiment, the approach described above may be utilized to identify any modifications applied to the data discovery request; for example, operations like grouping and aggregation can be identified as well as filters. When looking at the results of data discovery in a visual interface, a small segment may be selected for repeated monitoring, which in one example would have filters applied to it, but it is quite conceivable that when such a segment has been identified and a query generated from it, for the report that query is taken as the seed but modified. Modifications could be to any part of the query: projected columns, grouping columns, filters, aggregates, etc.

Hardware Mechanisms

Figure 5:
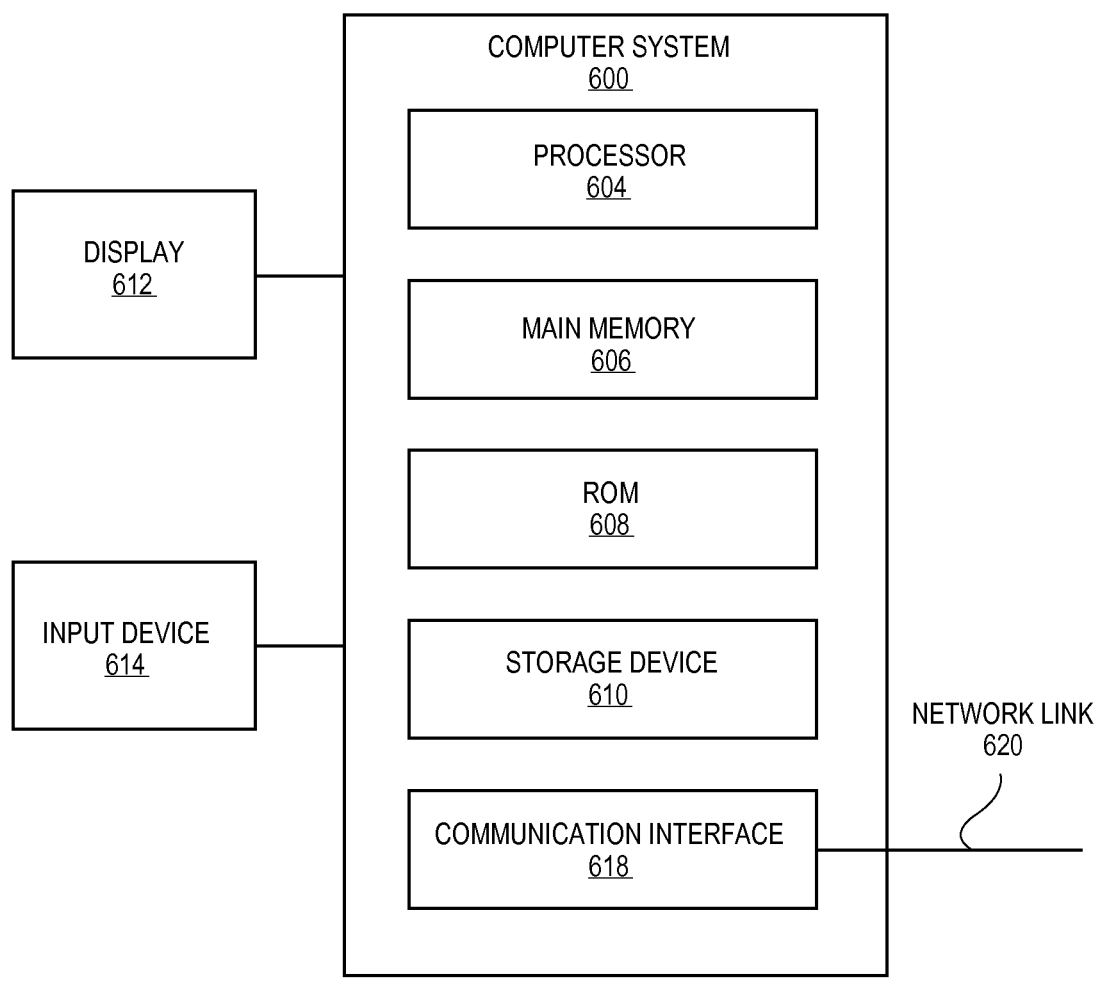
FIG. 5 is a block diagram that illustrates a computer system upon which an embodiment of the invention may be implemented.

In an embodiment, each of the software components depicted in FIG. 1 may be implemented on one or more computer systems. FIG. 5 is a block diagram that illustrates a computer system 600 upon which an embodiment of the invention may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 5, embodiments of the invention may include any number of input devices 614 coupled to computer system 600.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

What is claimed is:

1. A non-transitory computer-readable storage medium storing one or more sequences of instructions for generating a plurality of model driven Business Intelligence (BI) reports that are compatible with each of a plurality of target business intelligence tools and providing the plurality of model driven BI reports to the plurality of target business intelligence tools to perform analytics from within the plurality of target business intelligence tools, which when executed by one or more processors, causes:

populating reporting metadata tables in a database with a business intelligence tool agnostic report in a declarative format, wherein the business intelligence tool agnostic report is generated by creating a business intelligence tool agnostic graphical template and one or more business intelligence tool agnostic query templates that are built on metadata objects, wherein the business intelligence tool agnostic graphical template defines visual presentation aspects of the business intelligence tool agnostic report and the one or more business intelligence tool agnostic query templates define computation aspects of the business intelligence tool agnostic report, and wherein a format of the business intelligence tool agnostic graphical template and the one or more business intelligence tool agnostic query templates is agnostic of any business intelligence tool and the visual presentation aspects of the business intelligence tool agnostic report are separated from the computation aspects of the business intelligence tool agnostic report by separation of the business intelligence tool agnostic graphical template and the one or more business intelligence tool agnostic query templates;

retrieving a mapping between the one or more business intelligence tool agnostic query templates and a query mechanism defined by a target business intelligence tool and a compatibility between source presentation elements comprising the business intelligence tool-agnostic graphical template and target presentation elements defined by said target business intelligence tool from a metadata repository;

transforming, via an automated code-generation process, the business intelligence tool agnostic report into a business intelligence report that is compatible with said target business intelligence tool by substituting the target presentation elements for the source presentation elements in the business intelligence tool-agnostic graphical template, compensating for constructs not supported by the target business intelligence tool and handling any advanced report generation level constructs of said target business intelligence tool that are not specified in the declarative format during the process of code generation, wherein the automated code-generation process uses the business intelligence tool agnostic report described in the declarative format to generate the business intelligence report in a format executable by said target business intelligence tool for analytics;

executing elements in one or more query templates against all data sources specified in said one or more query templates when executing the business intelligence report in said target business intelligence tool; and populating the business intelligence report with data from all the data sources specified in said one or more query templates according to the target presentation elements of a graphical template, for performing analytics from within the target business intelligence tool, wherein said data from all the data sources specified in said one or more query templates are obtained through a network.

2. The non-transitory computer-readable storage medium of claim 1, wherein the execution of the one or more sequences of instructions further comprises:

upon determining, by a source metadata change detection module, at least one change in a data model of at least one of the data sources associated with said one or more query templates, further determining, by a change impact analysis module, an element of said one or more query templates that relies upon changed aspects of said data model by analyzing metadata describing relationship of said one or more query templates to the data model of said data source, with the analysis made possible by separation of said one or more query templates from said target presentation elements of said graphical template and storing of metadata of said one or more query templates with lineage to metadata of the data model; and automatically updating said one or more query templates to reflect said change in the data model of said data source whenever possible.

3. The non-transitory computer-readable storage medium of claim 1, wherein execution of the one or more sequences of instructions further comprises:

determining a number of query templates associated with said graphical template in the business intelligence report;

determining that at least two of the query templates have been designated as linked;

determining a change or other interaction made to at least one of the linked query templates having an implication on at least one of other linked query templates in the business intelligence report by analyzing metadata comprising data models of all data sources implicated by the linked query templates; and modifying the business intelligence report pursuant to a set of predefined interaction rules that specify behavior of linked query templates.

4. The non-transitory computer-readable storage medium of claim 3, wherein execution of the one or more sequences of instructions further comprises:

determining whether a filter is applied to at least one of the linked query templates by analyzing the metadata comprising the data model of all data sources implicated by the linked query templates; and encoding the application of the filter on at least one of the remaining linked query templates.

5. An apparatus for generating a plurality of model driven Business Intelligence (BI) reports that are compatible with each of a plurality of target Business Intelligence (BI) tools and providing the plurality of model driven BI reports to the plurality of target business intelligence tools to perform analytics from within the plurality of target business intelligence tools, comprising:

one or more processors; and one or more non-transitory computer-readable storage mediums storing one or more sequences of instructions, which when executed by the one or more processors, cause:

populating reporting metadata tables in a database with a business intelligence tool agnostic report in a declarative format, wherein the business intelligence tool agnostic report is generated by creating a business intelligence tool agnostic graphical template and one or more business intelligence tool agnostic query templates that are built on metadata objects, wherein the business intelligence tool agnostic graphical template defines visual presentation aspects of the business intelligence tool agnostic report and the one or more business intelligence tool agnostic query templates define computation aspects of the business intelligence tool agnostic report, and wherein a format of the business intelligence tool agnostic graphical template and the one or more business intelligence tool agnostic query templates is agnostic of any business intelligence tool and the visual presentation aspects of the business intelligence tool agnostic report are separated from the computation aspects of the business intelligence tool agnostic report by separation of the business intelligence tool agnostic graphical template and the one or more business intelligence tool agnostic query templates;

retrieving a mapping between the one or more business intelligence tool-agnostic query templates and a query mechanism defined by a target business intelligence tool and a compatibility between source presentation elements comprising the business intelligence tool-agnostic graphical template and target presentation elements defined by said target business intelligence tool from a metadata repository;

transforming, via an automated code-generation process, the business intelligence tool agnostic report into a business intelligence report that is compatible with said target business intelligence tool by substituting the target presentation elements for the source presentation elements in the business intelligence tool-agnostic graphical template, compensating for constructs not supported by the target business intelligence tool and handling any advanced report generation level constructs of said target business intelligence tool that are not specified in the declarative format during the process of code generation, wherein the automated code-generation process uses the business intelligence tool agnostic report described in the declarative format to generate the business intelligence report in a format executable by said target business intelligence tool for analytics;

executing elements in one or more query templates against all data sources specified in said one or more query templates when executing the business intelligence report in said target business intelligence tool; and populating the business intelligence report with data from all the data sources specified in said one or more query templates according to the target presentation elements of a graphical template, for performing analytics from within the target business intelligence tool, wherein said data from all the data sources specified in said one or more query templates are obtained through a network.

6. The apparatus of claim 5, wherein execution of the one or more sequences of instructions further causes:

upon determining, by a source metadata change detection module, at least one change in a data model of at least one of the data sources associated with said one or more query templates, further determining, by a change impact analysis module, an element of said one or more query templates that relies upon changed aspects of said data model by analyzing metadata describing relationship of said one or more query templates to the data model of said data source with the analysis made possible by separation of said one or more query templates from said target presentation elements of said graphical template and storing of metadata of said one or more query templates with lineage to metadata of the data model; and automatically updating said one or more query templates to reflect said change in the data model of said data source whenever possible.

7. The apparatus of claim 5, wherein execution of the one or more sequences of instructions further causes:

determining a number of query templates associated with said graphical template in the business intelligence report;

determining that at least two of the query templates have been designated as linked;

determining a change or other interaction made to at least one of the linked query templates having an implication on at least one of other linked query templates in the business intelligence report by analyzing metadata comprising data models of all data sources implicated by the linked query templates; and modifying the business intelligence report pursuant to a set of predefined interaction rules that specify behavior of linked query templates.

8. The apparatus of claim 7, wherein execution of the one or more sequences of instructions further causes:

determining whether a filter is applied to at least one of the linked query templates by analyzing the metadata comprising the data model of all data sources implicated by the linked query templates; and encoding the application of the filter on at least one of the remaining linked query templates.

9. A method for generating a plurality of model driven Business Intelligence (BI) reports that are compatible with each of a plurality of target Business Intelligence (BI) tools and providing the plurality of model driven BI reports to the plurality of target business intelligence tools to perform analytics from within the plurality of target business intelligence tools, comprising:

populating reporting metadata tables in a database with a business intelligence tool agnostic report in a declarative format, wherein the business intelligence tool agnostic report is generated by creating a business intelligence tool agnostic graphical template and one or more business intelligence tool agnostic query templates that are built on metadata objects, wherein the business intelligence tool agnostic graphical template defines visual presentation aspects of the business intelligence tool agnostic report and the one or more business intelligence tool agnostic query templates define computation aspects of the business intelligence tool agnostic report, and wherein a format of the business intelligence tool agnostic graphical template and the one or more business intelligence tool agnostic query templates is agnostic of any business intelligence tool and the visual presentation aspects of the business intelligence tool agnostic report are separated from the computation aspects of the business intelligence tool agnostic report by separation of the business intelligence tool agnostic graphical template and the one or more business intelligence tool agnostic query templates;

retrieving a mapping between the one or more business intelligence tool-agnostic query templates and a query mechanism defined by a target business intelligence tool and a compatibility between source presentation elements comprising the business intelligence tool-agnostic graphical template and target presentation elements defined by said target business intelligence tool from a metadata repository;

transforming, via an automated code-generation process, the business intelligence tool agnostic report into a business intelligence report that is compatible with said target business intelligence tool by substituting the target presentation elements for the source presentation elements in the business intelligence tool-agnostic graphical template, compensating for constructs not supported by the target business intelligence tool and handling any advanced report generation level constructs of said target business intelligence tool that are not specified in the declarative format during the process of code generation, wherein the automated code-generation process uses the business intelligence tool agnostic report described in the declarative format to generate the business intelligence report in a format executable by said target business intelligence tool for analytics;

executing elements in one or more query templates against all data sources specified in said one or more query templates when executing the business intelligence report in said target business intelligence tool; and populating the business intelligence report with data from all the data source specified in said one or more query templates according to the target presentation elements of a graphical template, for performing analytics from within the target business intelligence tool, wherein said data from all the data sources specified in said one or more query templates are obtained through a network.

10. The method of claim 9, further comprising:

upon determining, by a source metadata change detection module, at least one change in a data model of at least one of the data sources associated with said one or more query templates, further determining, by a change impact analysis module, an element of said one or more query templates that relies upon changed aspects of said data model by analyzing metadata describing relationship of said one or more query templates to the data model of said data source, with the analysis made possible by separation of said one or more query templates from said target presentation elements of said graphical template and storing of metadata of said one or more query templates with lineage to metadata of the data model; and automatically updating said one or more query templates to reflect said change in the data model of said data source whenever possible.

11. The method of claim 9, further comprising:

determining a number of query templates associated with said graphical template in the business intelligence report;

determining that at least two of the of query templates have been designated as linked;

determining a change or other interaction made to at least one of the linked query templates having an implication on at least one of other linked query templates in the business intelligence report by analyzing metadata comprising data models of all data sources implicated by the linked query templates; and modifying the business intelligence report pursuant to a set of predefined interaction rules that specify behavior of linked query templates.

12. The method of claim 11, further comprising:

determining whether a filter is applied to at least one of the linked query templates by analyzing the metadata comprising the data model of all data sources implicated by the linked query templates; and encoding the application of the filter on at least one of the remaining linked query templates.

* * * * *